United States Patent [19]

Carlen

[11] Patent Number: 5,048,384
[45] Date of Patent: Sep. 17, 1991

[54] CENTERING DEVICE

[75] Inventor: Eric T. Carlen, Roanoke, Va.

[73] Assignee: Carlen Controls, Inc., Roanoke, Va.

[21] Appl. No.: 515,751

[22] Filed: Apr. 30, 1990

[51] Int. Cl.⁵ .............................................. B23B 23/02
[52] U.S. Cl. ........................................ 82/170; 82/903
[58] Field of Search ............... 82/170, 903; 33/191; 29/64

[56] References Cited

U.S. PATENT DOCUMENTS

| | | |
|---|---|---|
| 2,411,621 | 11/1946 | Grubbs . |
| 2,809,044 | 8/1957 | Landreth ................................ 82/170 |
| 3,037,409 | 6/1962 | Hare et al. ............................ 82/170 |
| 3,259,394 | 7/1966 | Buck ....................................... 82/170 |
| 3,289,505 | 12/1966 | Pyke ....................................... 82/170 |
| 3,435,657 | 4/1969 | Weissman . |
| 3,460,847 | 8/1969 | Hohwart et al. ..................... 82/170 |
| 4,512,184 | 4/1985 | Ernst et al. . |

Primary Examiner—Frederick R. Schmidt
Assistant Examiner—Lawrence Cruz
Attorney, Agent, or Firm—Sterne, Kessler, Goldstein & Fox

[57] ABSTRACT

A device for centering a feedback tachometer on an output motor shaft. The device includes a housing disposed on the motor shaft. The housing includes a base and flange in which is received a mandrel shaft. The central axis of the mandrel shaft may be aligned with the central axis of the motor shaft by set screws provided in the flange and are individually adjustable against the mandrel shaft to alter the position thereof within the flange. An adapter plate may be provided for attaching the base to the motor shaft.

17 Claims, 3 Drawing Sheets

CENTERING DEVICE

FIELD OF THE INVENTION

This invention relates to a centering device, and more particularly to a centering device for the attachment of an indicator to a drive motor output shaft.

BACKGROUND OF THE INVENTION

It is widely known that any large drive system for use in, for example, a steel, paper, rubber or other processing mill requires precise speed control. Such precise speed control is dependent upon several factors, one being the integrity of the speed control device itself, another being the manner in which the speed control device is mounted on the drive system.

Heretofore, when it was desirable to measure the speed at which the output shaft of a drive system was operating, it was commonplcae to attach a speed control device or other indicator, such as a feedback tachometer or transducer, directly to the drive system output shaft. While this arrangement is capable of providing an indication of the speed at which the drive system is operating, unles the tachometer is perfectly centered on the output shaft, the tachometer will not provide a pure indication or signa of the true motor speed of the system. That is, although a tachometer that is disposed on the motor shaft off-center will provide an indication of motor speed, it may not be the true or exact motor speed in that unwanted error signals will also be indicated. The equation for tachometer feedback is expressed as follows: $D_{FDBK} = K_N \times RPM + K_E \sin \omega t$. The $K_N \times RPM$ component is the ideal feedback signal which is the linear relationship between actual shaft speed, measured in revolutions per minute (RPM) and the feedback signal $E_{FDBK}$. $K_N$ is a proportionality constant. $K_E \sin \omega t$ is a sinusoidal waveform with a magnitude factor of $K_E$ which is proportional to the amount of eccentricity between the motor shaft and the tachometer shaft. The frequency of oscillation is proportional to shaft speed. Typically with a drive motor turning 600 RPM, the frequency of oscillation is:

$$\frac{600 \text{ RPM}}{60 \text{ sec/min}} = 10 \text{ revolutions per second}$$

This frequency is passed through the tachometer amplifiers and cannot be filtered since the frequency is within the bandwidth of most high-performance control systems. This error signal ends up greatly amplified in motor armature current, setting up vibrational torque at or around the natural frequency of machinery causing large amounts of vibration, resulting in damage to both the product and the machinery producing it. In order to eliminate any unwanted error signals due to misalignment of the tachometer and to ensure a reading of the true motor speed, the tachometer must be aligned with the center of the motor shaft.

Centering devices have been previously suggested. Such devices have proven helpful in centering an attachment to a rotating element, and utilize an element adjustably received within a housing by opposing screws. Examples of such devices are found in U.S. Pat. No. 2,411,621 to Grubbs; U.S. Pat. No. 3,460,847 to Hohwart et al.: Italian Patent Document No. 505895; and Swiss Patent Document No. 393,499. However, none of these examples are directed to the particular environment of the present invention. That is, in which the rotating element is a motor shaft, and the housing is used to center a shaft on the motor shaft to which a measurement indicator is attached. Thus, until the development of the present invention, no one has provided a means by which a measurement indicator, such as a tachometer, can be easily secured to a motor shaft or other rotational device, but yet ensure that the measurement thus provided is consistent and accurate.

SUMMARY OF THE INVENTION

The present invention overcomes the problems and deficiencies discussed above by providing a centering device for aligning a velocity indicator with the true center of a motor shaft to achieve concentricity. The centering device may comprise a housing including a base for attachment to the motor shaft and a flange disposed on the base substantially perpendicular thereto. A mandrel shaft, including a base end received within the flange may also be provided. Means for adjusting the base end of the mandrel shaft with the flange, such that the central axis of the mandrel shaft is in alignment with the central axis of the motor shaft, may comprise a plurality of set screws and in particular may include three or four such screws. Means for maintaining the base end of the mandrel shaft within the flange may include a cover plate with a plurality of hold-down screws threaded through the cover and flange. A plurality of tilting screws may be provided within the cover plate which contact the base of the mandrel shaft and an adapter plate may be provided between the motor shaft and the centering device.

These and other features of the invention will become apparent from the following description of a preferred embodiment of the invention.

BRIEF DESCRIPTION OF THE DRAWINGS

The foregoing and other objects, aspects, features and advantages of the present invention will be more fully appreciated as the same become better understood from the following detailed description of the present invention when considered in conjunction with the accompanying drawings, in which.

DETAILED DESCRIPTION OF THE PREFERRED EMBODIMENT

Figure 1:
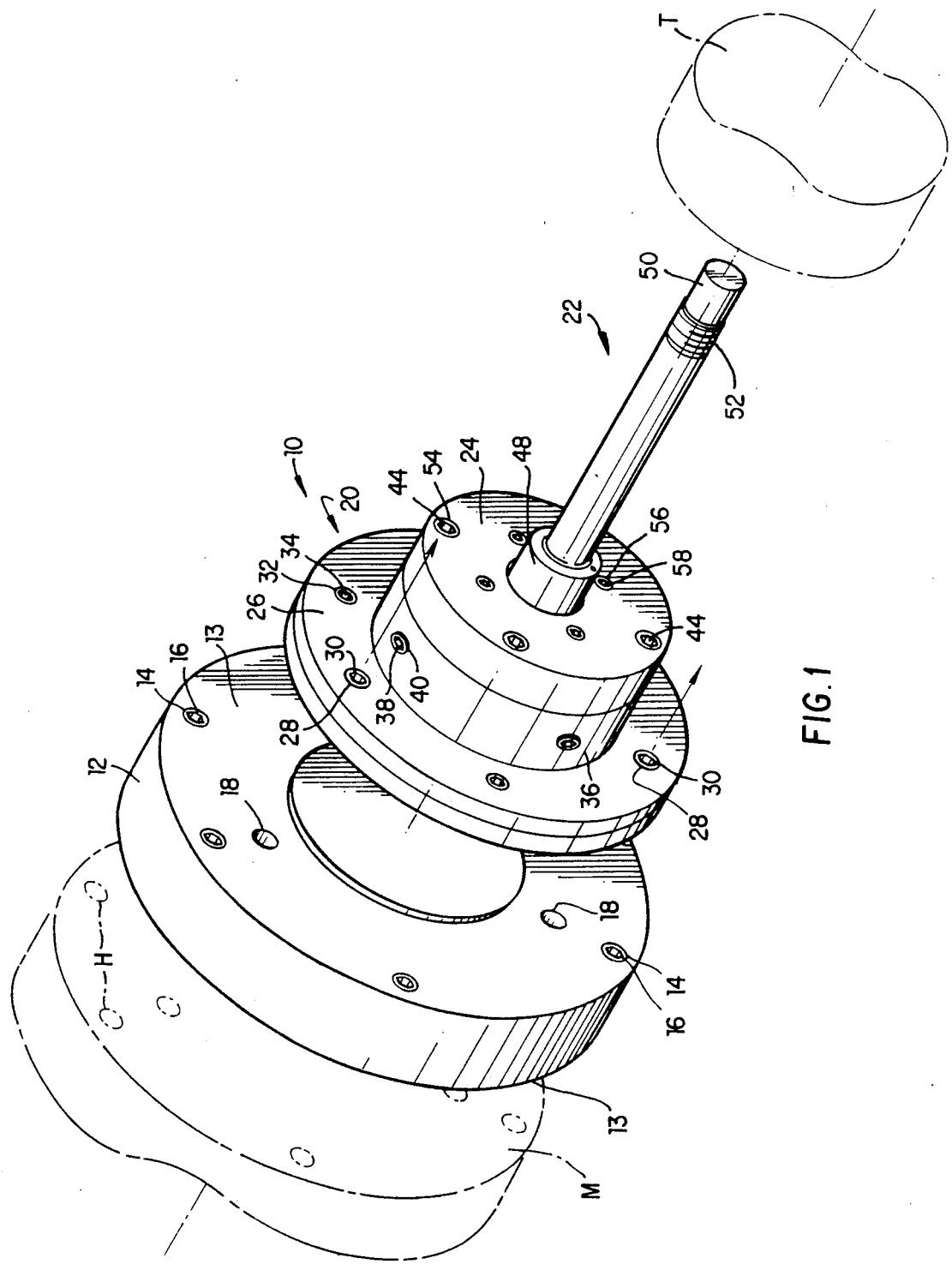
FIG. 1 shows a perspective view of the centering device according to the present invention.

Referring now to the drawings, in which similar reference numerals have been used to refer to similar elements, and in particular to FIG. 1, the centering device of the present invention is shown generally by the numeral 10. FIG. 1 shows centering device 10 in its preferred environment, that is, in which it serves as an interface between a drive motor output shaft M and an indicator, such as a feed back tachometer. T. It should be understood that centering device 10 may be used in a variety of other environments (e.g., automated machinery, mills machine tools, robotics and aerospace applications and is shown and described in the present application) with regard to a motor shaft and a tachometer or velocity indicator for ease of reference only.

Centering device 10 may be directly affixed to drive motor output shaft M or it may be fastened thereto through an intermediary adaptor plate 12, as shown in FIG. 1. Motor shaft M is depicted in FIG. 1 as having holes H for receiving attachment screws, bolts or the like. While Allen bolts have been shown in the figures, any equivalent fasteners may be utilized. Adaptor plate 12 may be eliminated when motor shaft M is provided with holes H which are in alignment with the attachment holes of centering device 10, as will be described in greater detail below.

Adaptor plate 12 is substantially circular or disk-shaped. It is made of steel or other suitable material. Plate 12 is approximate equal in diameter to motor shaft M. However, it is not necessary that the diameters be equal. Plate 12 has two substantially planar or parallel surfaces or sides 13, which are substantially identical. Plate 12 includes six holes 14 for receiving six adaptor plate attachment screws 16 for attaching adaptor plate 12 to motor shaft M. While in the preferred embodiment there are six such holes and screws, only four of the six holes and screws are visible in FIG. 1. However, it should be understood that the particular number of holes and attachment screws for attaching adaptor plate 12 to motor shaft M is not to be limited to the particular number shown.

Also provided in adaptor plate 12 are three centering holes 18 for receiving centering screws 30 for attaching centering device 10 to plate 12. While only two of the three centering holes are shown in FIG. 1, it should be understood that a third hole is hidden from view in the figure. As with the attachment screws 14 described above, any number of centering screws 30 can be provided for attaching centering device 10 to adaptor plate 12. However, three such holes 18 and corresponding screws 30, as described below, are preferred.

Figure 2:
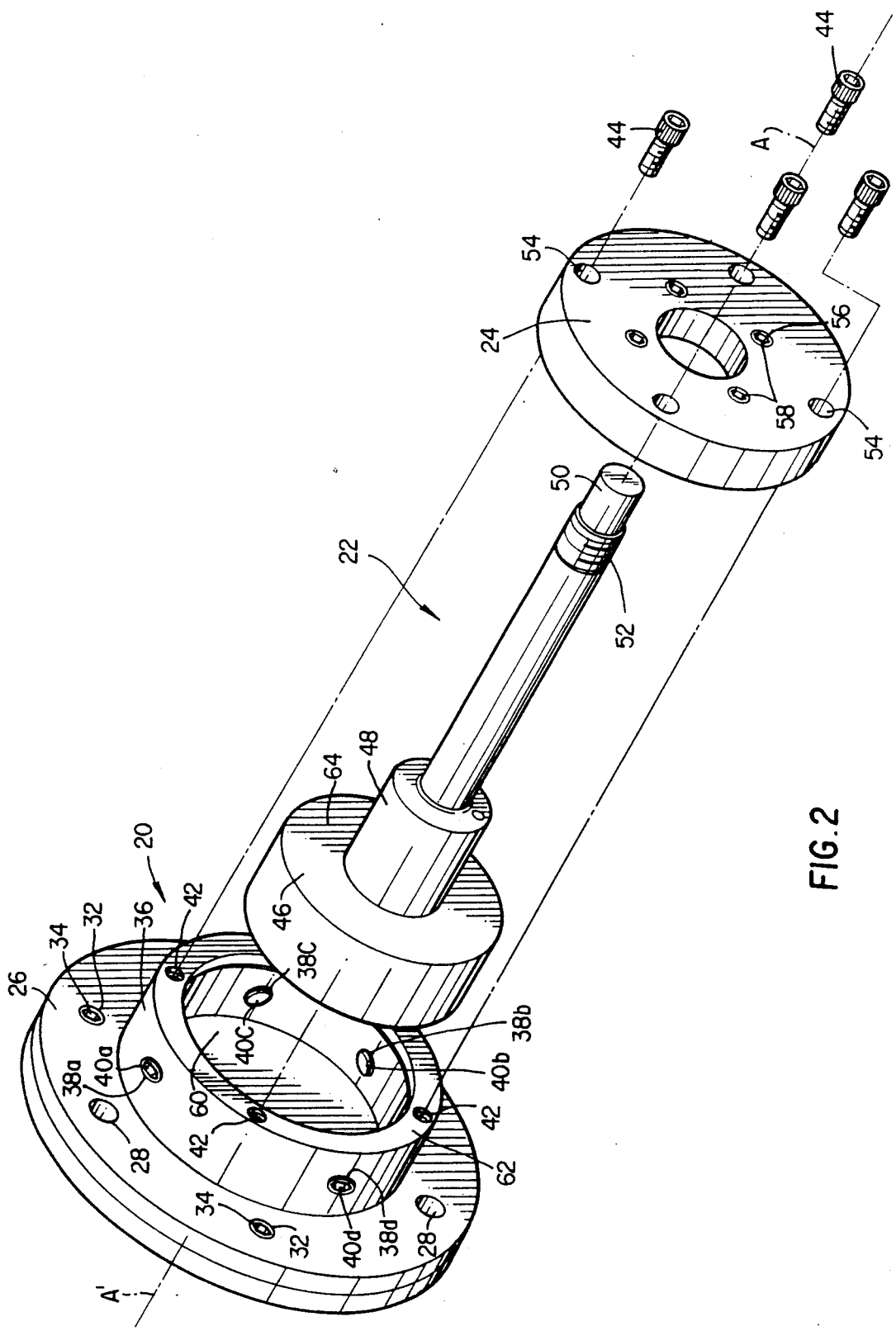
FIG. 2 shows an exploded view of the centering device of FIG. 1.
Figures 3, 4:
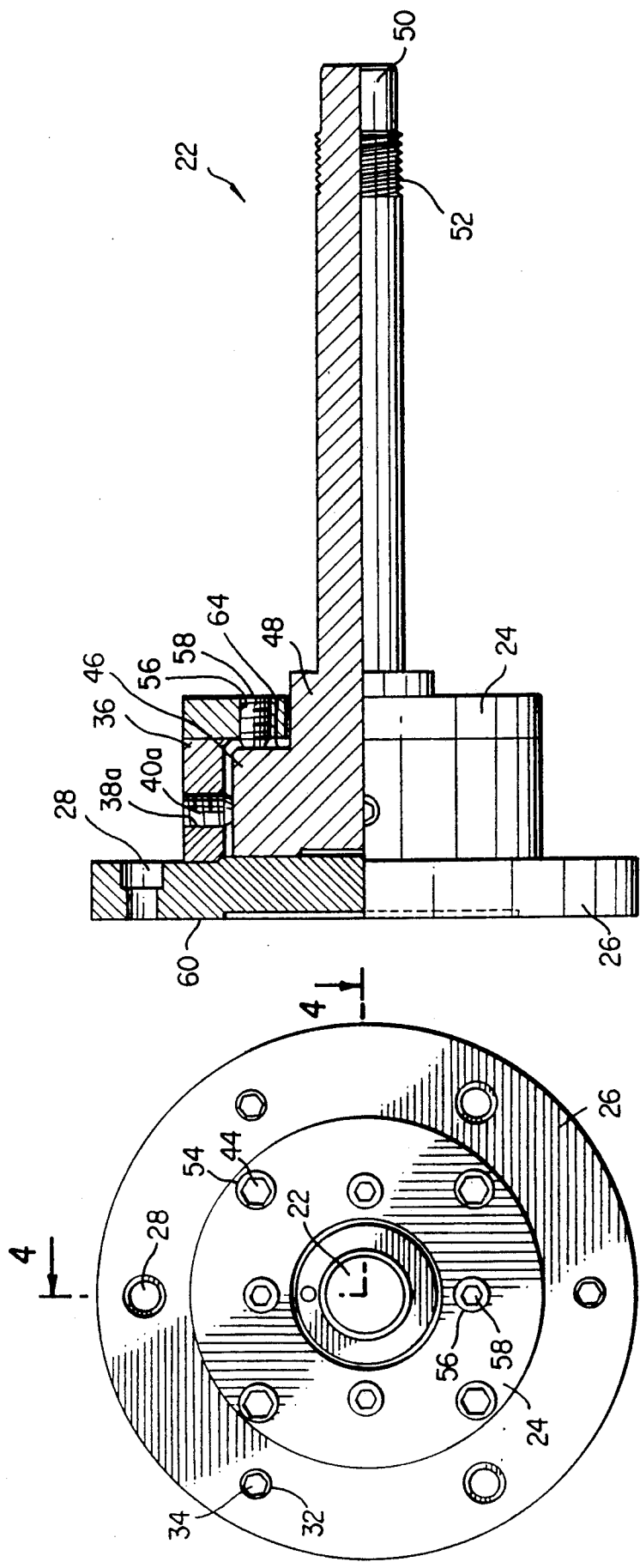
FIG. 3 is a top plan view of the centering flange of FIG. 1.
FIG. 4 is a cross sectional view taken along line 4—4 in FIG. 3.

With continuing reference to FIG. 1, as well as FIGS. 2, 3 and 4, centering device 10 is comprised of a housing, shown generally at 20; a mandrel shaft, shown generally at 22; and a cover plate shown generally at 24. The entire device 10 is preferably constructed of steel or other suitable material capable of handling the speeds and temperature at which the particular drive motor output shaft operates. Housing 20 includes a base 26 and flange 36. Base 26 is generally circular or disk-shaped having two opposing substantially planar or parallel surfaces 60. In the preferred embodiment, base 26 is approximately 7 inches in diameter and ½ inch thick. However, other diameters and thicknesses are possible depending upon the intended use of the device. Three base holes 28 for receiving three centering screws 30 are provided through base 26 for attaching centering device 10 to adaptor plate 12 which is attached to motor shaft M; or directly to motor shaft M. Three adjustment holes 32 are also provided through base 26 for receiving three base adjustment or tilting screws 34, the function of which is to balance base 26 on plate 12 or shaft M to minimize shaft runout. Shaft runout is defined as the angle of deviation between an actual shaft centerline and a true shaft centerline as measured in the axial direction from the mounted end of the centering device. Shaft runout is observed as an orbiting motion at the distal end of a shaft during shaft rotation. Screws 34 have blunt tips which are individually adjustable to press against the surfaces of plate 12 or directly against shaft M and therefore can adjust the relationship of the base 26 to surface 60 or to shaft M.

Flange 36 is generally cylindrical and may be formed integral with base 26, or attached thereto by any conventional means. Four holes 38a-d are provided through the cylindrical walls of flange 36 for receiving four set screws 40a-d. The purpose and function of set screws 40a-d will be described below with regard to the operation and use of centering device 10. Four holes 42, perpendicular to holes 38a-d but off-set therefrom, are also provided in flange 36 for receiving four hold down screws 44 from cover plate 24, as discussed below.

Mandrel shaft 22 includes a base end 46, intermediate portion 48 and a distal end 50. The preferred length of shaft 22 is 7 inches. The diameter of base end 46 is preferably greater than that of the distal end 50, although other configurations are possible. As best seen in FIG. 4, base end 46 is received within cylindrical flange 36 of housing 20. Distal end 50 of mandrel shaft 22 is preferably threaded as shown at 52, to receive a complementary securement means for securing tachometer T thereto.

As best seen in FIG. 2, cover plate 24 includes four holes 54 for receiving four hold down screws 44. Hold down screws 44 are secured in holes 42 of cylindrical flange 36 to maintain base 46 within flange 36. Four holes 56 are also provided in cover plate 24. Holes 56 are substantially perpendicular to holes 38a-d and receive four tilting or adjustment screws 58, similar to screws 34 described above. Screws 58 further maintain base end 46 within flange 36 and are for adjustment and balancing of base end 46 within flange 36, as described below.

In use, centering device 10 is attached to motor shaft M either directly by screws 30 received in holes 28 of base 26; or by screws 30 received in holes 18 of adaptor plate 12. If adaptor 12 is used, one face 13 of the plate is attached to motor shaft M via screws 16 received within holes 14 of the adaptor plate and holes H of motor shaft M. Centering device 10 is attached to the opposite face 13 of the plate. Centering device 10 is attached by screws 30 received within holes 28 formed along base 26 of housing 20. Once housing 20 is securely attached to adaptor 12, vertical adjustment of base 26 may be achieved by adjustment or tilting screws 34. Each adjustment screw 34 includes a blunt end which when screwed in place against the surface of the adaptor plate 12 (or motor shaft M) allows the runout of base 26 to be adjusted and balanced with regard to the surface of adaptor plate 12 (or motor shaft M).

Base end 26 of mandrel shaft 22 is received within centering flange 26 and held in place by friction from set screws 40a-d. A magnetic dial indicator (not shown) is attached to end 50 of mandrel shaft 22 and is used to determine when the central axis A of mandrel shaft 22 is in alignment with the true center or axis A′ of motor shaft M. As best seen in FIG. 4, in order to perfectly center axis A of mandrel shaft 22 with axis A′ of motor shaft M, set screws 40a-d are individually adjusted according to a signal or other sign given by the dial indicator. The preferred method of adjusting screws 40a-d is to adjust screw 40a first, then screw 40b, followed by screw 40c and finally screw 40d, repeating the process until axes A and A′ are in alignment and mandrel shaft 22 is, therefore, aligned with motor shaft M. Other methods of adjustment which will achieve the desired function of aligning the central axis A of mandrel shaft 22 with the central axis A′ of motor shaft M may also be followed.

After the central axis A of mandrel shaft 22 is in perfect alignment with the central axis A' of motor shaft M, the dial indicator is removed from shaft 22. Cover plate 24 is secured to surface 62 of flange 36 by hold down screws 44 which extend through cover plate 24 and into flange 36. Tilting or adjustment screws 58, as best seen in FIG. 4, may then be adjusted against surface 64 of mandrel shaft base end 46 to maintain base end 26 securely within flange 36. Tachometer T, or other indicator, may then be attached or otherwise supported on distal end 50 of mandrel shaft 22. With the central axis of mandrel shaft 22 in perfect alignment with the central axis of shaft M, tachometer T received on distal end 50 of mandrel shaft 22 will provide an indication of the true motor speed of motor shaft M. Rather than centering mandrel shaft 22 on motor shaft M, the present invention may also be useful in positioning an indicator or other device at an angle to the central axis A' of motor shaft M, if so desired by the same method as above. However, rather than using the dial indicator to center the axis, it can be used to offset them.

It should be understood that the foregoing disclosure relates only to presently preferred embodiments, and that it is intended to cover all changes and modifications of the invention herein chosen for the purpose of the disclosure, which do not constitute departures from the spirit and scope of the invention as set forth in the appended claims.

What is claimed is:

1. A centering device for attaching an indicator to a motor shaft comprising:
    a housing including a base for attachment to said motor shaft, and a flange disposed on said base substantially perpendicular thereto;
    a mandrel shaft including a base end and a distal end, said base end received within said flange, said distal end including means for receiving an indicator for indicating the rotational output of said motor shaft;
    means for adjusting said base end of said mandrel shaft within said flange such that a central axis of said mandrel shaft is in alignment with a central axis of said motor shaft; and
    wherein said indicator, when provided on said distal end of said mandrel shaft, provides a true indication of the rotation of said motor shaft.

2. A centering device as set forth in claim 1, wherein said means for adjusting said base end of said mandrel shaft within said flange includes a plurality of threaded means provided in said flange for individually exerting pressure upon said base end of said mandrel shaft to thereby adjust the position thereof relative to said flange.

3. A centering device as set forth in claim 2, wherein said threaded means comprises set screws.

4. A centering device as set forth in claim 3, wherein said plurality of set screws includes three.

5. A centering device as set forth in claim 4, wherein said plurality of set screws is four.

6. A centering device as set forth in claim 2, further comprising means for maintaining said base end of said mandrel shaft within said flange.

7. A centering device, as set forth in claim 6, wherein said means for maintaining said base end of said mandrel shaft within said flange includes a cover plate and a plurality of hold down screws received therein, said hold down screws being threaded through holes provided in said cover plate and said flange.

8. A centering device, as set forth in claim 7, further comprising a plurality of tilting screws received within said cover plate and contacting said base end of said mandrel shaft, said tilting screws being arranged substantially perpendicular to said plurality set screws to thereby maintain said base end within said flange.

9. A centering device, as set forth in claim 1 further including an adaptor plate having two sides, said motor shaft being affixed to one side of said adaptor plate and said housing being affixed to the other side of said adaptor plate.

10. A centering device, as set forth in claim 1, wherein said indicator is a tachometer.

11. A centering device, as set forth in claim 1, wherein said motor shaft is a drive motor output shaft.

12. A centering device for attaching a velocity indicator to a motor shaft, comprising:
    means for supporting said indicator for indicating the rotational output of said motor shaft;
    means for housing said supporting means for said indicator, said housing means being attached to said motor shaft; and
    means for adjusting said supporting means within said housing means such that a central axis of said supporting means is an alignment with a central axis of said motor shaft.

13. A centering device, as set forth in claim 12, wherein said supporting means comprises a mandrel shaft.

14. A centering device, as set forth in claim 13, wherein said housing means comprises a base and a flange disposed on said base substantially perpendicular thereto.

15. A centering device, as set forth in claim 14, wherein said means for adjusting said supporting means includes a plurality of set screws.

16. A centering device for disposing a feedback tachometer on a motor shaft to measure the true speed of a motor, comprising:
    a base attached to the motor shaft;
    a flange disposed on said base;
    a mandrel shaft including a base end received within said flange and a distal end including means for receiving said feedback tachometer;
    a plurality of set screws disposed within said flange and contacting said base end of said mandrel shaft to adjust the position of said base end within said flange to thereby achieve concentricity of shaft runout of said motor shaft.

17. A centering device, as set forth in claim 16, wherein said plurality of set screws includes three.

* * * * *